US007557809B2

(12) United States Patent
Nakatsuka et al.

(10) Patent No.: US 7,557,809 B2
(45) Date of Patent: Jul. 7, 2009

(54) MEMORY ACCESS METHODS IN A UNIFIED MEMORY SYSTEM

(75) Inventors: Yasuhiro Nakatsuka, Tokai (JP); Tetsuya Shimomura, Hitachi (JP); Manabu Jyou, Hitachi (JP); Yuichiro Morita, Hitachi (JP); Takashi Hotta, Hitachi (JP); Kazushige Yamagishi, Tokyo (JP); Yutaka Okada, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 428 days.

(21) Appl. No.: 10/983,757

(22) Filed: Nov. 9, 2004

(65) Prior Publication Data

US 2005/0062749 A1 Mar. 24, 2005

Related U.S. Application Data

(63) Continuation of application No. 09/791,817, filed on Feb. 26, 2001, now Pat. No. 6,839,063.

(30) Foreign Application Priority Data

Aug. 25, 2000 (JP) ............................ 2000-254986

(51) Int. Cl.
*G06F 13/14* (2006.01)
*G09G 5/39* (2006.01)
*G06F 15/167* (2006.01)

(52) U.S. Cl. ....................... 345/520; 345/519; 345/531; 345/541; 345/542

(58) Field of Classification Search ................. 345/519, 345/533–535, 541–543, 530, 520, 531
See application file for complete search history.

(56) References Cited

U.S. PATENT DOCUMENTS

| | | | | |
|---|---|---|---|---|
| 4,975,857 | A | 12/1990 | Katsura et al. | |
| 5,706,034 | A | 1/1998 | Katsura et al. | |
| 5,713,011 | A * | 1/1998 | Satoh et al. | 713/501 |
| 5,771,047 | A | 6/1998 | Ohba et al. | |
| 5,790,138 | A | 8/1998 | Hsu | |
| 5,848,247 | A * | 12/1998 | Matsui et al. | 710/104 |
| 5,940,087 | A | 8/1999 | Katsura et al. | |
| 5,977,997 | A | 11/1999 | Vainsencher | |
| 6,104,417 | A | 8/2000 | Nielsen et al. | |
| 6,108,014 | A | 8/2000 | Dye | |
| 6,331,857 | B1 | 12/2001 | Hussain et al. | |
| 6,580,427 | B1 | 6/2003 | Orenstein et al. | |
| 6,754,784 | B1 * | 6/2004 | North et al. | 711/145 |

FOREIGN PATENT DOCUMENTS

JP 11-510620 9/1999

* cited by examiner

*Primary Examiner*—Hau H Nguyen
(74) *Attorney, Agent, or Firm*—Mattingly & Malur, PC

(57) ABSTRACT

The basic section of the multimedia data-processing system includes a CPU 1100, an image display unit 2100, a unified memory 1200, a system bus 1920, and devices 1300, 1400, and 1500 connected to the system bus. In this configuration, the CPU is formed on an LSI mounted on a single silicon wafer including instruction processing unit 1110 and display control unit 1140. Main storage area 1210 and display area 1220 are stored within the unified memory. Unified memory port 1910 for connecting the corresponding LSI and the unified memory is provided independently of the system bus intended to connect the LSI and the input/output devices. The unified memory port can be driven faster than system bus.

7 Claims, 11 Drawing Sheets

RELATIONSHIP BETWEEN INTERFACE FREQUENCIES

| ITEM | CALL-OUT NO. | SYMBOL | CONDITION | FREQUENCY EXAMPLE 1 | FREQUENCY EXAMPLE 2 |
|---|---|---|---|---|---|
| SYSTEM BUS | 1920 | fs | REFERENCE | 42MHZ | 50MHz |
| MEMORY PORT | 1910 | fm | =m×fs | 84MHZ | 100MHz |
| INSTRUCTION PROCESSING | 1110 | fc | =n×fs | 168MHZ | 150MHz |
| DISPLAY OUTPUT | 1930 | fd | ≦fm/2 | 15MHZ | 40MHz |

FIG. 7
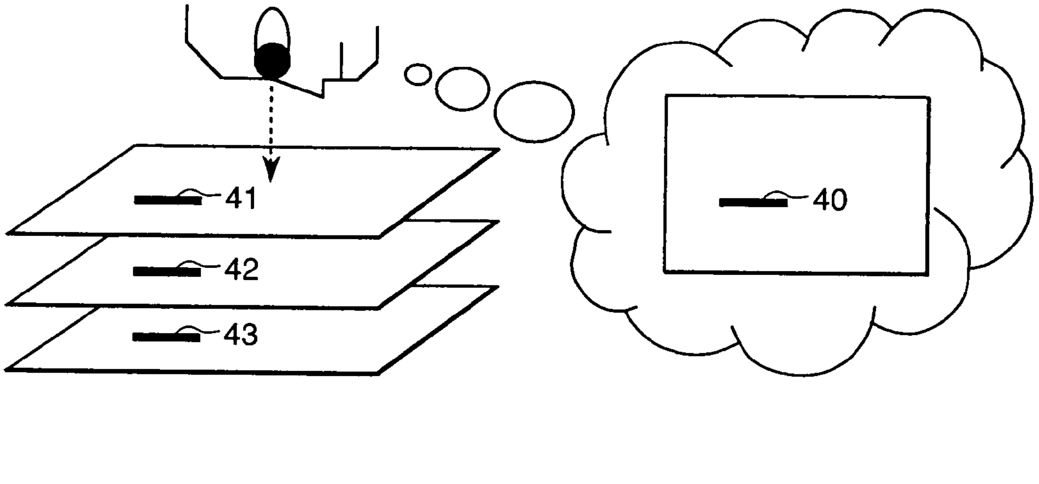
FIG. 8
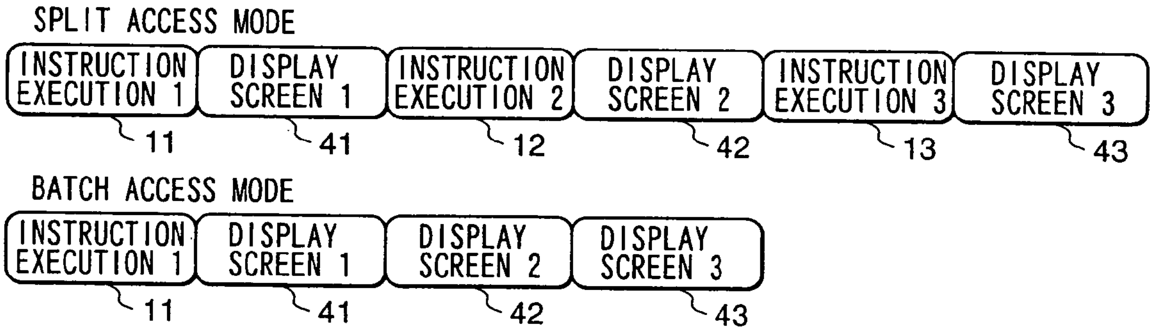
FIG. 9
DISPLAY ACCESS MODE SETTINGS
| DISPLAY ACCESS MODE | EXAMPLE OF CONDITION | EXAMPLE OF 'fm' | EXAMPLE OF 'fd' |
|---|---|---|---|
| SPLIT | fd / fm≦0.3 | 84MHz | 15MHz |
| BATCH | fd / fm≦0.3 | 100MHz | 40MHz |

FIG. 10

| UMMR | R/W | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | | AM | PC | DPM | EC | DAM | | | | | | | | | | | |

(1) BUS ARBITRATION MODE (AM:Arbitration Mode)
THE AM BIT SPECIFIES THE METHOD OF ASSIGNING PRIORITY LEVELS FOR BYS ARBITRATION. NEW SETTINGS BY AM BIT UPDATING ARE MADE VALID BY INTERNAL UPDATING.

| bit 15 | OPERATION |
|---|---|
| 0 | TAKES SGBC, RU AND CIU AS HAVING THE SAME PRIORITY LEVEL, AND ASSIGNS BUS CONTROL TO THESE UNITS IN ORDER OF THE ARRIVAL OF THEIR REQUESTS. OF COURSE, IF EITHER OF THE THREE UNITS AND A HIGHER-PRIORITY UNIT (SUCH AS VIU OF DU) ISSUE A BUS CONTROL REQUEST AT THE SAME TIME, VIU OR DU WILL TAKE PRECEDENCE. THE ABOVE-MENTIONED ORDER OF ARRIVAL APPLIES ONLY TO SGBU, RU, AND CIU. (DEFAULT) |
| 1 | AN INDEPENDENT PRIORITY LEVEL CAN BE ASSIGNED TO SGBC, RU, AND CIU EACH. HOWEVER, THE SAME PRIORITY LEVEL CANNOT BE ASSIGNED TO TWO OR MORE UNITS. |

(2) PRIORITY CHANGE (PC:Priority Change)
THE PRIORITY LEVELS THAT HAVE BEEN SPECIFIED IN REGISTERS ARE SET AS THE PRIORITY LEVELS FOR BUS ARBITRATION. VALID ONLY WHEN AM IS SET TO '1'.

| bit 14 | OPERATION |
|---|---|
| 0 | THE PRIORITY LEVELS THAT HAVE BEEN SPECIFIED IN REGISTERS (SPR, RPR, PP1R, PP2R) ARE NOT SET AS THE PRIORITY LEVELS FOR BUS ARBITRATION. (DEFAULT) |
| 1 | THE PRIORITY LEVELS THAT HAVE BEEN SPECIFIED IN REGISTERS ARE SET AS THE PRIORITY LEVELS FOR BUS ARBITRATION. THE PRIORITY LEVELS FOR BUS ARBITRATION ARE UPDATED, ONLY WHEN ALL THE ABOVE REGISTERS ARE CORRECTLY SET. WHEN DATA SETTINGS ARE CORRECT, THE ABOVE REGISTER DATA IS INCORPORATED DURING INTERNAL UPDATING, AND THEN THE PC BIT IS CLEARED AUTOMATICALLY. EVEN WHEN DATA SETTINGS ARE WRONG, THE PC BIT IS ALSO CLEARED AUTOMATICALLY DURING INTERNAL UPDATING. |

(3) DISPLAY UNIT PREFERENCE MODE (DPM:Display Unit Prefernce Mode)
THE DPM BIT SPECIFIES A BUS ARBITRATION PRIORITY LEVEL TO THE DISPLAY UNIT. NEW SETTINGS BY DPM BIT UPDATING ARE MADE VALID BY INTERNAL UPDATING.

| bit 13 | OPERATION |
|---|---|
| 0 | ASSIGNS THE SAME PRIORITY LEVEL TO THE DISPLAY UNIT AND THE VIDEO INPUT UNIT. (SAME AS Q2SD. DEFAULT.) |
| 1 | ASSIGNS THE DISPLAY UNIT A HIGHER PRIORITY LEVEL THAN THAT OF THE VIDEO INPUT UNIT. THE SCREEN DISPLAY SIZE CAN BE INCREASED, COMPARED WITH THE CASE OF 'o'. IF THE SETTING OF THE DPM BIT IS '1', NORMAL OPERATION OF THE VIDEO INPUT UNIT IS GUARANTEED, ONLY WHEN IT SATISFIES LIMITATIONS. |

(4) ENDIAN CHANGE MODE (EC:Endian Change Mode)
THE ECM BIT SPECIFIES WHETHER THE ENDIAN CHANGE FUNCTION IS TO BE PERFORMED ON UNITS SUCH AS THE PIXEL GENERATION UNIT AND DISPLAY UNIT.

| bit 12 | OPERATION |
|---|---|
| 0 | ENDIAN CHANGE NOT PERFORMED. (DEFAULT) |
| 1 | ENDIAN CHANGE PERFORMED. |

(5) DISPLAY ACCESS MODE (DAM:Display Access Mode)
THE DAM BIT SPECIFIES WHETHER MULTIPLE-SCREEN DISPLAY ACCESS IS TO BE SPLIT OR TO MADE IN BATCH FORM.

| bit 11 | OPERATION |
|---|---|
| 0 | MULTIPLE-SCREEN DISPLAY ACCESS SPLIT. (DEFAULT) |
| 1 | MULTIPLE-SCREEN DISPLAY ACCESS MADE IN BATCH FORM. |

| PRR | R/W | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| | | | | MP | | | | CP | | | | SP | | | | RP | |

(1)-(4) BUS ARBITRATION PRIORITY LEVELS
(MP:MCUPriority) (CP:CIU Priority)
(SP:SGBC Priority) (RP:RU Priority)

THE PRIORITY LEVEL FOR BUS ARBITRATION IS TO BE SPECIFIED IN TWO BITS FOR EACH UNIT. IT IS PROHIBITED TO ASSIGN THE SAME VALUE TO MULTIPLE UNITS.

- QSC3 BEGINS WITH UM ADDRESS 0000000.
- UM AREA 1:USED WHEN TWO 512M-BIT SDRAMS ARE CONNECTED IN PARALLEL.
- THE ADDRESSES 3FC0000 TO 3FFFFFF IN QSCO CANNOT BE USED.
- THE ON-RESET DEFAULT IS PATTERN ①.

MEMORY ACCESS METHODS IN A UNIFIED MEMORY SYSTEM

This application is a continuation of U.S. patent application Ser. No. 09/791,817, filed Feb. 26, 2001, now U.S. Pat. No. 6,839,063 which is incorporated by reference herein in its entirety.

BACKGROUND OF THE INVENTION

The present invention relates to memory access methods for use in a unified memory system, especially, to the technology applicable to a computer system capable of performing arithmetic operations, creating video data, and presenting it on a display unit.

In conventional display and processing equipment using an unified memory, as set forth in Published Japanese Translations of PCT International Publications for Patent Application, Hei-510620 (1999), when the main storage and the image memory are integrated into a single memory, the CPU and the image memory are separated via a memory control feature called the "core logic". A similar equipment configuration is also disclosed in U.S. Pat. No. 5,790,138.

The prior art mentioned above is merely an integrated version of main storage and display areas. In this case, access from the instruction processing unit to the unified memory uses a system controller that constitutes the instruction processing unit and the chipset, and, for this reason, the latency increases. Since this is not allowed for in the prior art, the instruction processing time tends to increase. That is to say, the prior art has poses the inherent problem that the system performance deteriorates.

SUMMARY OF THE INVENTION

The main object of the present invention is to supply memory access methods in a unified memory system that are best suited for minimizing increases in latency in order to improve the above-mentioned situation, and for suppressing the deterioration of system performance in terms of unified memory configuration as well.

In order to solve the problem described above, in a multimedia data-processing system having at least one instruction processing unit, at least one display control unit, at least one input/output unit, and at least one unified memory comprising the areas accessed by said instruction processing unit and the areas accessed by said display control unit, an interface for connecting said unified memory and the LSI integrating at least said instruction processing unit and said display unit formed on a single silicon substrate is provided separately from an interface intended to connect said LSI and said input/output unit.

Also, said unified memory is included in said LSI. and an interface for access to the unified memory is formed within said LSI.

BRIEF DESCRIPTION OF THE DRAWINGS

FIG. 7 is a diagram of a display screen combination image based on the present invention.

FIG. 8 is a diagram of display access modes based on the present invention.

FIG. 9 is a diagram of display access mode settings based on the present invention.

FIG. 10 is a diagram of a register function based on the present invention.

DETAILED DESCRIPTION OF PREFERRED EMBODIMENTS

Embodiments of the present invention will be described below with reference to the drawings.

Figure 1:
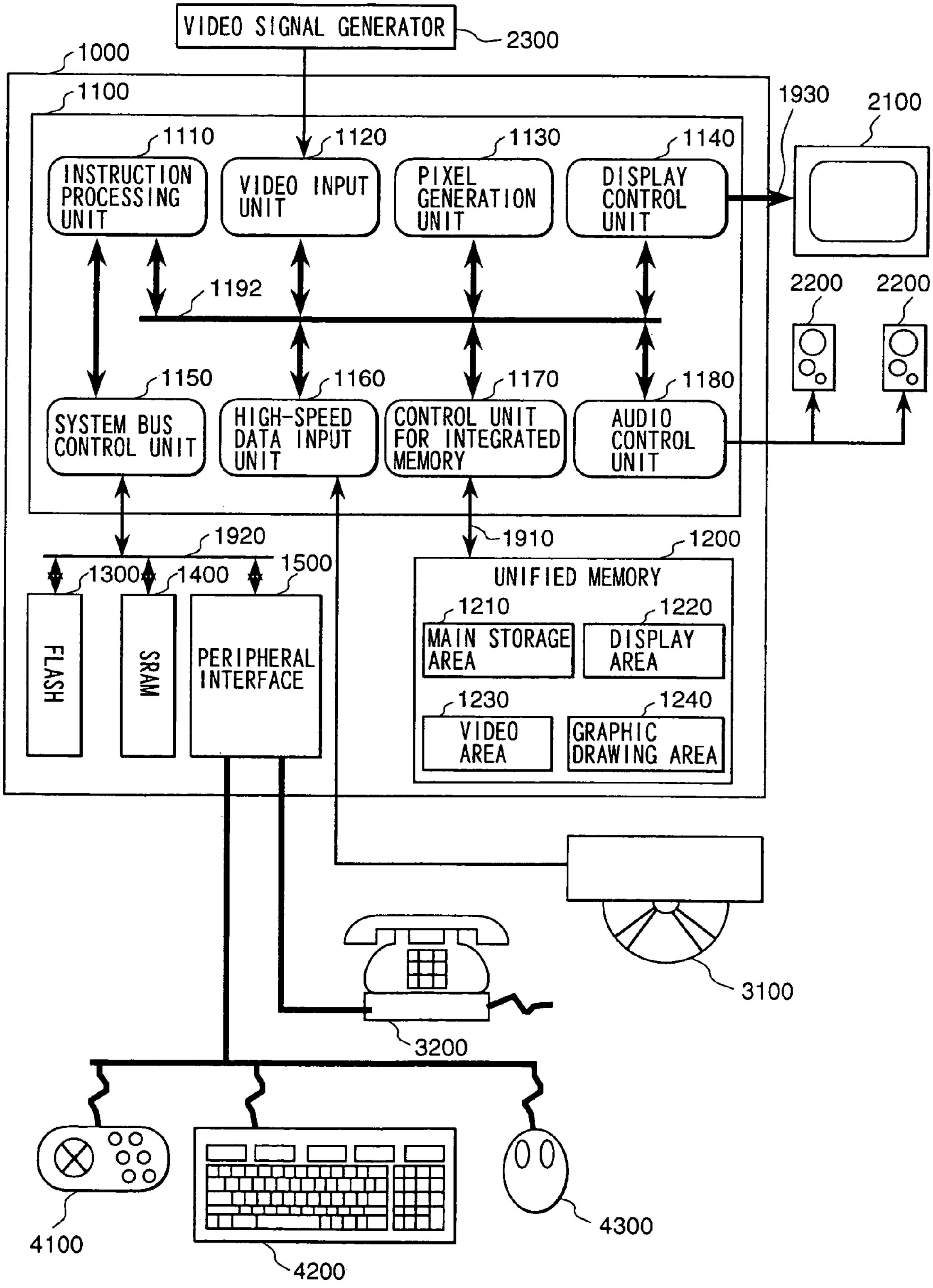
FIG. 1 is a block diagram of an embodiment of a system using a memory access method based on the present invention.

An embodiment of a memory access method based on the invention will be described with reference to the system shown in FIG. 1. In FIG. 1, multimedia data input/output units, data input/output and communications units, and user instruction input units are added to a multimedia data-processing system 1000.

The multimedia data input/output units consist of image display unit 2100, audio signal generator 2200, and video signal generator 2300. The data input/output and communications units consist of modem 3200, which establishes connection to communications lines, and drive 3100, which is able to access external storage media, such as a CD-ROM and DVD. The user instruction input units comprise keypad 4100, keyboard 4200, and mouse 4300.

Multimedia data-processing system 1000 comprises CPU 1100, unified memory 1200, auxiliary storage devices, such as flash memory 1300 and SRAM 1400, and input/output-use peripheral interface 1500 for connecting the user instruction input unit and modem 3200.

Also, CPU 1100 has input/output terminals for drive 3100 and multimedia data input/output units 2100, 2200, and 2300. These terminals are connected to display control unit 1140, audio control unit 1180, video input unit 1120, and high-speed data input/output unit 1160, each of which is located inside the CPU 1100. CPU 1100 has bus terminals for exchanging data with unified memory 1200, with the auxiliary storage devices, such as flash memory 1300 and SRAM 1400, and with the peripheral interface 1500. The auxiliary storage devices (1300 and 1400) and peripheral interface 1500 are connected to system bus control unit 1150 located inside the CPU 1100. CPU 1100 has an interface for connection to the drive 3100. These are connected to high-speed data input/output unit 1160 located inside the CPU 1100. CPU 1100 also has an interface for connection to the unified memory 1200. This unified memory is connected to unified memory control unit 1170 located inside the CPU 1100. In addition to these units, CPU 1100 contains instruction processing unit 1110 and pixel generation unit 1130.

Instruction processing unit 1110 has 64-bit bus terminals, to which video input unit 1120, pixel generation unit 1130, display control unit 1140, bus control unit 1150, high-speed data input/output unit 1160, unified memory control unit 1170, and audio control unit 1180 are connected via 64-bit internal bus 1192. Internal bus 1192 has its usage control arbitrated by unified memory control unit 1170.

For this purpose, system bus control unit 1150 and other portions are connected via control signal lines. Also, instruction processing unit 1110 is connected to system bus control unit 1150 via another internal bus 1191, and it can be connected to devices 1300, 1400, and 1500, all of which are present on the system bus 1920.

Unified memory control unit 1170 is connected to unified memory 1200 via unified memory port 1910, unified memory 1200 has memory areas shared by the internal components of CPU 1100. These memory areas comprise main storage area 1210, which is mainly used by instruction processing unit 1110, display area 1220, which is mainly used by display control unit 1140, video area 1230, which is mainly used by video input unit 1120, and graphic pattern drawing area 1240, which is mainly used by pixel generation unit 1130. Since these areas are arranged in a single address space, they can be freely variable in terms of both position and size. Although the present embodiment assumes a 64-bit pattern, the contents of the present invention do not limit the bus width.

Figures 2, 3:
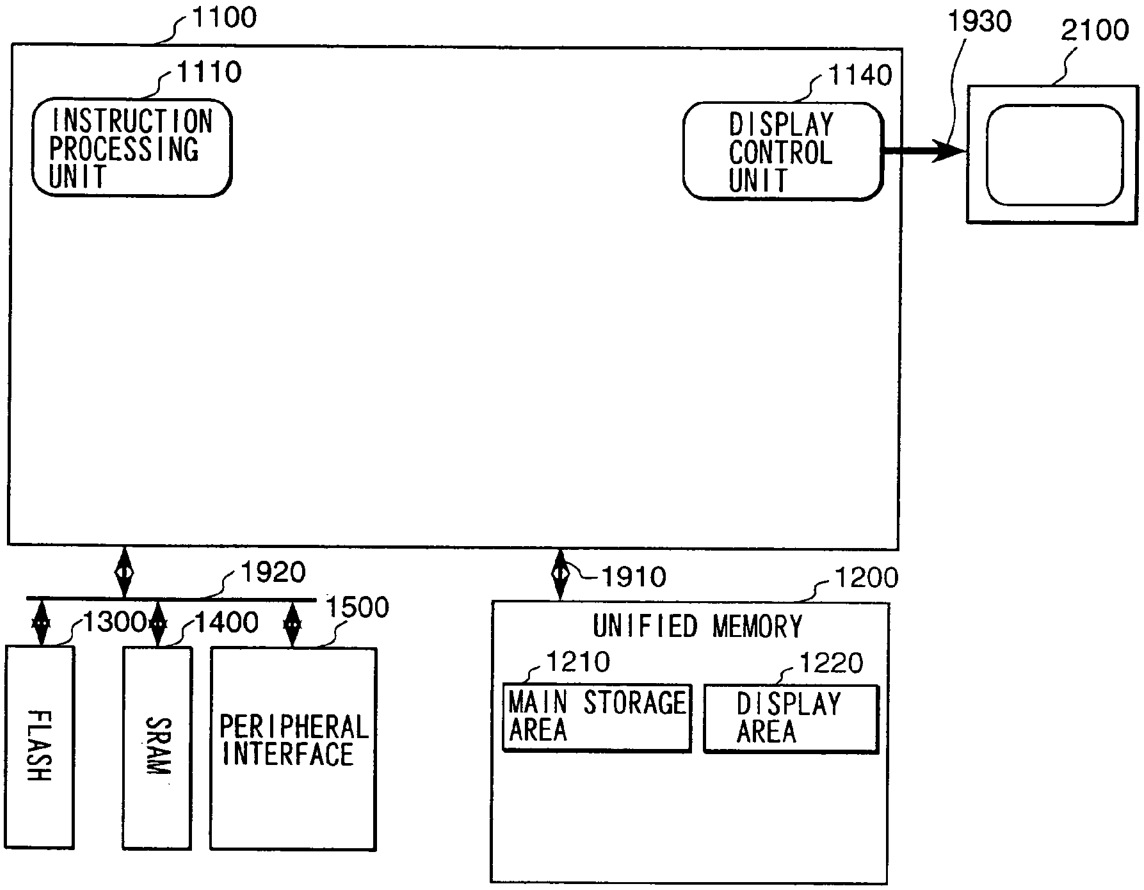
FIG. 2 is a block diagram showing only the basic section of a multimedia data-processing system based on the present invention.
FIG. 3 is a diagram showing the relationship between interface frequencies based on the present invention.

Only the basic section of the multimedia data-processing system 1000 shown in FIG. 1 is shown in FIG. 2. This basic section comprises CPU 1100, image display unit 2100, unified memory 1200, unified memory port 1910, system bus 1920, and devices 1300, 1400, and 1500 connected to the system bus. In this figure, CPU 100 is formed on an LSI mounted on a single silicon wafer including instruction processing unit 1110 and display control unit 1140. Main storage area 1210 and display area 1220 are contained within unified memory 1200. Unified memory port 1910 can be driven faster than the system bus 1920.

It is possible to include the unified memory in the LSI on which the CPU 1100 is formed, and to form the unified memory port 1910 inside the LSI.

Under the present embodiment, with both the instruction processing unit 1110 and the display control unit 1140 inside CPU 1100, main storage area 1210 and display area 1220 are provided within the single unified memory 1200 to reduce the number of memory components and thus to contribute to size reduction of the system. In this case, since unified memory port 1910 is provided independently of the system bus 1920 in order to avoid the likely deterioration of performance due to concentrated access to the unified memory 1200, access to the unified memory 1200 is enhanced in terms of speed, and, thus, the problem of performance deterioration can be solved.

Examples of equipment configurations based on the present invention and the prior art will be described below for comparative purposes with reference to FIGS. 22 and 23.

Figure 22:
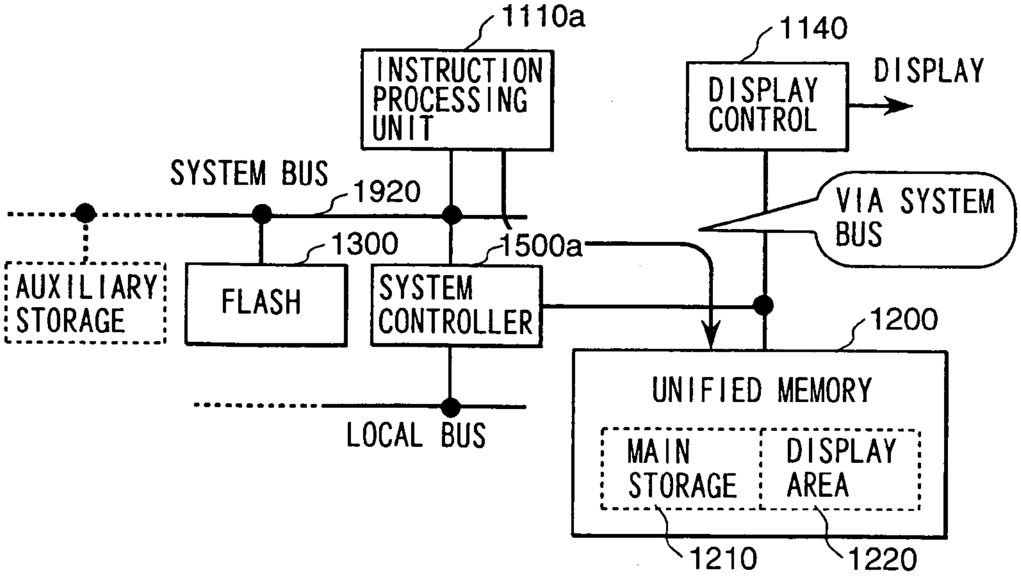
FIG. 22 is a block diagram illustrating the characteristics of a configuration based on prior art.

An example of an equipment configuration based on the prior art is shown in FIG. 22. Instruction processing unit 1110*a* is not contained in CPU 1100 and is connected to system controller 1500*a* via system bus 1920. Unified memory 1200 is connected to system controller 1500*a*. Signals from instruction processing unit 1110*a* are therefore sent from system controller 1500*a* through the system bus to unified memory 1200.

In general, flash memory 1300, which contains a boot program intended to initialize instruction processing unit 1110*a* during system startup, is connected to system bus 1920. In actual applications, an auxiliary storage device for exclusive use by instruction processing unit 1110*a* is also connected to the system bus 1920. In such a configuration, since the system bus 1920 has a number of system components connected thereto, the electrical load is significantly increased and the bus cannot be driven fast. Although the operating frequency at this time depends on the quality of the board design, about 33 MHz would be the maximum achievable operating frequency.

System controller 1500*a* also has a local bus for connecting various peripheral units and an interface for access to unified memory 1200. Unified memory 1200 is shared with display control unit 1140. In this example, the interface to unified memory 1200 is electrically connected. The electrical load on the system bus 1500*a*, therefore, increases significantly, and this also becomes an obstruction to the improvement of the operating frequency. In this example, where only three system components are connected, about 50 MHz would be the maximum achievable operating frequency.

Also, since the bus is connected at the same potential, the bus is most likely to be driven by system controller 1500*a*, display control unit 1140, and unified memory 1200, and, for this reason, arbitration among the three components is required. In addition, since system controller 1500*a* and display control unit 1140, in particular, operate actively with respect to unified memory 1200, several cycles are obviously required for the mere purpose of arbitration on bus access, and this increases the overhead. In short, access from instruction processing unit 1110*a* to unified memory 1200 requires two chipset crossovers, arbitration overhead, and even an operation time at about 33 MHz.

Figure 23:
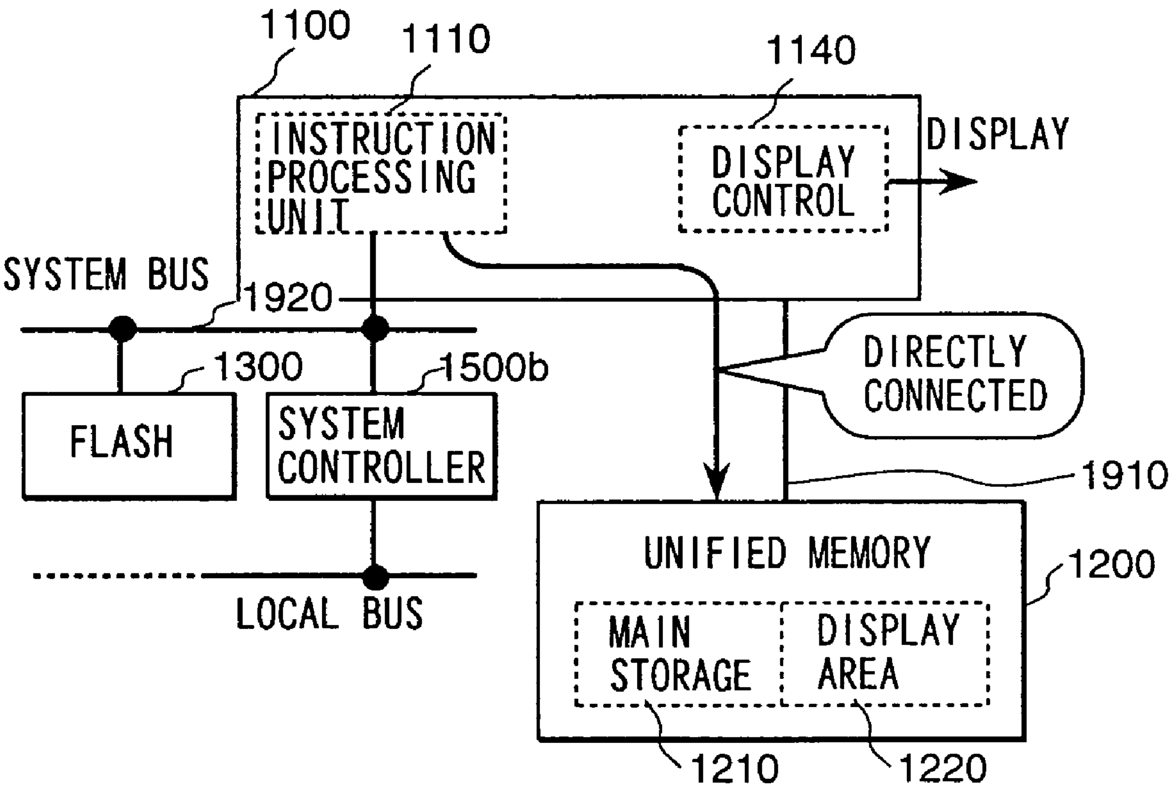
FIG. 23 is a block diagram illustrating the characteristics of a configuration based on the present invention.

An example of an equipment configuration based on the present invention is shown in FIG. 23. Instruction processing unit 1110 and display control unit 1140 are contained in single CPU 1100. CPU 1100 has a special access port 1910 to unified memory 1200. Thus, CPU 1100 and unified memory 1200 are connected in point-to-point connection form, and signals from instruction processing unit 1110 are directly transmitted to unified memory 1200 via access port 1910.

In accordance with the present invention, as described above, signal transmission from instruction processing unit 1110 to unified memory 1200 is not via system controller 1500*b*. The Electrical load, therefore, decreases. The fact that simple board wiring is employed also reduces the load. Accordingly, the operating frequency can be improved and fast driving at 100 MHz, for example, is possible. Only one chipset crossover is required for access from either instruction processing unit 1110*a* or display control unit 1140, and fast driving is possible. System bus 1920, which is expected not to operate fast because of its significant load, is provided independently of the unified memory port 1910 and operates at low speed.

Next, faster access to unified memory 1200 will be described with reference to FIGS. 3 to 6.

In FIG. 3, the relationship between interface frequencies is shown for the purpose of comparison between frequency "fs" of system bus 1920, frequency "fm" of unified memory port 1910, internal operating frequency "fc" of instruction processing unit 1110, and frequency "fd" of the display output signal 1930 from display control unit 1140. Although internal bus 1192 is not shown, this bus operates at "fm".

The frequencies mentioned above can be freely combined and the present invention does not limit the respective values. Two cases different in frequency settings, however, are described below. Both cases have the characteristic that "fm" is greater than "fs". Access to unified memory 1200, based on the present invention, can be made faster than in the conventional configuration with connected main storage unit 1210 on system bus 1920.

An example of frequency setting based on "fs" is shown in FIG. 3, where "n" and "m" under the "Condition" column are integers of 2 or greater. These integers are employed because the synchronization of "fs", "fm", and "fc" reduces overhead associated with mutual access. The value of 2 is employed in order to utilize the characteristic of the present invention that enables faster accessing than in the conventional configuration. Also, "fd" is a value dependent on image display unit 2100, and this frequency is asynchronous since it needs to be flexible. Its synchronization occurs in display control unit 1140. In order to make the synchronization easy, "fd≦fm/2" is set for display control unit 1140 to read out data from the display area 1220 of unified memory 1200. This, however, assumes an example of a synchronizing circuit and does not limit the present invention.

In frequency example 1, "fs" is 42 MHz, "fm" is twice as large (84 MHz), and "fc" is four times as large (168 MHz). Internal bus 1191 operates at "fm", and "fs-fm" conversion occurs in system bus control unit 1150 and "fm-fc" conversion occurs in instruction processing unit 1110. Since "fm" is twice as large as "fs", unified memory 1200 is accessible at high speed. Also, since "fc" is twice as large as "fm", synchronization between the frequency "fm" of internal bus 1192 and "fc" is easy, and this is another factor which contributes to faster accessing. In addition, since "fc" is twice as large as "fm", the upper limit value of "fm" is determined by that of "fc". Furthermore, "fd" is also limited, and, in this example, it is limited to 15 MHz. This frequency is sufficient to produce a display of about 400 pixels (horizontal) and 240 pixels (vertical), and the configuration in this case satisfies requirements relating to screen size and CPU performance.

In frequency example 2, "fs" is 50 MHz, "fm" is twice as large (100 MHz), and "fc" is three times as large (150 MHz). Although internal bus 1191 operates at "fm" in frequency example 1, this bus operates at "fs" in frequency example 2. Also, although the operating frequency of internal bus 1191 remains fixed at "fm", the interface to instruction processing unit 1110 operates at "fs" so as to avoid complex circuit composition due to the fact that, when "fm-fc" conversion occurs in instruction processing unit 1110, the conversion is a 2-versus-3 conversion. In this case, access from instruction processing unit 1110 to unified memory 1200 is via the interface of "fs" in frequency. Therefore, although the access performance decreases, the upper limit value of "fm" can be increased to ⅔ of "fc". This, in turn, makes it possible to increase the display frequency "fd" as well, and, in this example, to 40 MHz, which is equivalent to a screen size of about 800 pixels and 480 pixels. That is to say, in this configuration, the screen size takes priority over CPU performance.

Figure 4:
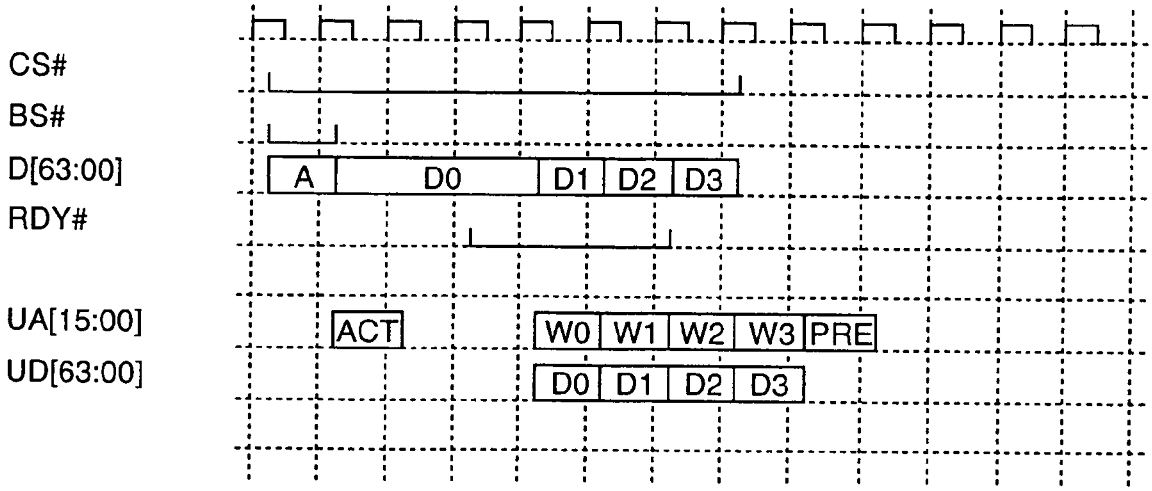
FIG. 4 is a diagram which shows an example of an unified memory write timing signal waveform based on the present invention.

The timing of write-access from instruction processing unit 1110 to unified memory 1200 is shown in FIG. 4. Chip select signal CS#, bus start signal BS# denoting the leading edge thereof, and address/data multiplexed signal D are issued from instruction processing unit 1110. The sharp symbol (#) denotes negative logic. Unified memory control unit 1170, after receiving these signals, receives address A appended to the beginning of signal D, and outputs the address to unified memory 1200. This embodiment assumes an SDRAM as unified memory 1200. After arbitrating on the use of internal bus 1192, unified memory control unit 1170 converts address A into the equivalent ACT command of the SDRAM and then sends the command.

Instruction processing unit 1110 has a burst data transfer function. In this embodiment, four write operations (W0 to W3) are performed in one bus cycle. Thus, data can be transferred at high speed. Since unified memory control unit 1170 needs to receive from instruction processing unit 1110 the data written into the SDRAM (namely, D0 to D3), transfer permission signal RDY# is asserted in the timing that commands W0 to W3 are issued.

Figure 5:
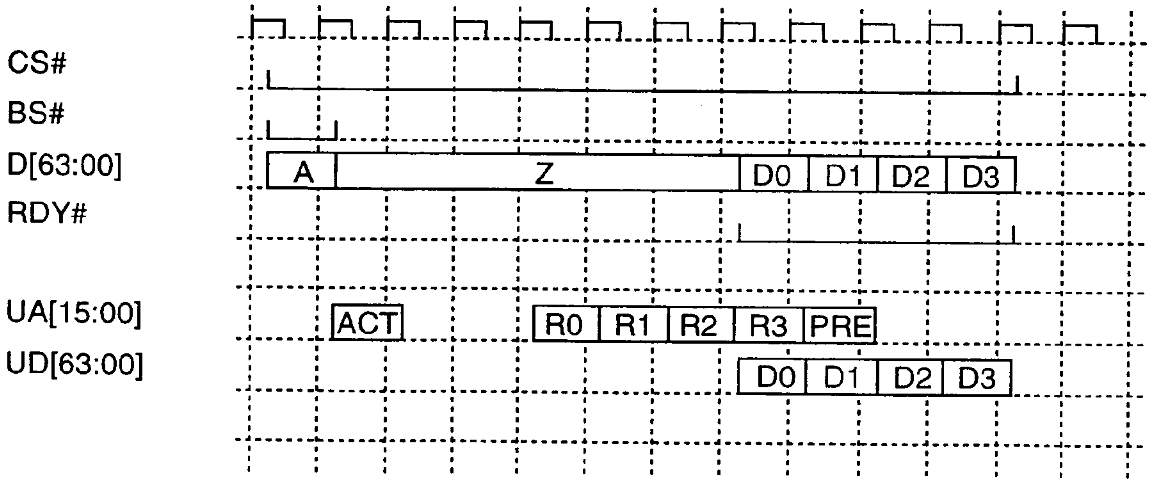
FIG. 5 a diagram which shows an example of an unified memory read timing signal waveform based on the present invention.

The timing of read-access from instruction processing unit 1110 to unified memory 1200 is shown in FIG. 5. Unified memory control unit 1170, after receiving signals from instruction processing unit 1110, receives address A appended to the beginning of signal D, and outputs the address to unified memory 1200. This embodiment assumes an SDRAM as unified memory 1200. After arbitrating on the use of internal bus 1192, unified memory control unit 1170 converts address A into the equivalent ACT command of the SDRAM and then sends the command. After this, instruction processing unit 1110 temporarily releases the bus (this state is shown as Z in the figure) in order to prepare for input of the data that is to be read into the SDRAM.

Instruction processing unit 1110 issues read commands R0 to R3. Since read operations require a fixed access time, the arrivals of data D0 to D3 are delayed by several cycles. Instruction processing unit 1110 has a burst data transfer function based on such arrival timing of data. In this embodiment, four read operations (R0 to R3) are performed in one bus cycle. Thus, data can be transferred at high speed. Since unified memory control unit 1170 needs to receive from instruction processing unit 1110 the data to the SDRAM (namely, D0 to D3), transfer permission signal RDY# is asserted in the timing that commands W0 to W3 are issued. Burst transfer is possible for reading as well.

The fact that the burst transfer shown in FIGS. 4 and 5 is valid for the unified memory configuration will be described with reference to FIG. 6.

In conventional embodiments, the standard interface of system bus 1920 must always be used to make access from instruction processing unit 1110 to unified memory 1200. The standard interface enables data to be transferred only one time in one bus cycle. When the performance of the instruction processing unit 1110 is considered, a line transfer time associated with the possible mis-operation of the cache memory built into instruction processing unit 1110 is important in terms of performance. Line transfer via the standard interface, however, is executed in a plurality of split bus cycles (D0, D1, D2, D3). This state is shown in "Instruction processing (1)" of FIG. 6. By the way, since unified memory 1200 shares various internal units, a latency due to contention between cache line transfer and other access operations (such as display) is likely to occur in each bus cycle. This state is shown in "Unified memory (1)" of FIG. 6. Resultingly, the total time required for access from instruction processing unit 1110 increases.

Figure 6:
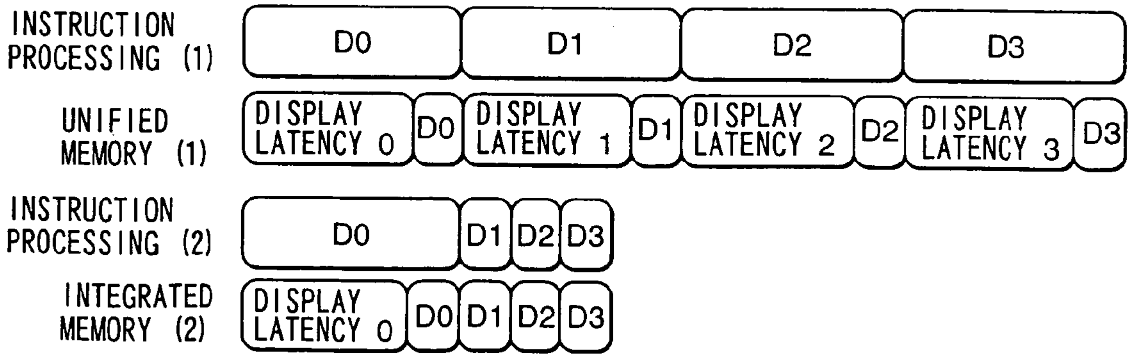
FIG. 6 is a diagram which shows an example of internal burst transfer based on the present invention.

During burst transfer based on the present invention, such latency as mentioned above occurs only once, with the result that, as shown in "Instruction processing (2)" and "Unified memory (2)" of FIG. 6, faster access from instruction processing unit 1110 to unified memory 1200 can be achieved.

Display access restrictions, which are other embodiment conditions based on the unified memory configuration, will be described with reference to FIGS. 7 to 9.

An example of display screen composition is shown in FIG. 7. The results obtained by overlapping a plurality of planes are presented as the final display on the screen. The display data access unit 40 on the final display corresponds to the display data access units 41, 42, and 43 of the respective planes. When data is displayed, three sets of data equivalent to access units 41, 42, and 43 are independently read out from unified memory 1200, and then data corresponding to access unit 40 is created from transparency calculation and other processing results. Since display data needs to be sequentially output at a display clock frequency of "fd" before the display can operate properly, the access operations in access units 41, 42, and 43 must be completed within a predetermined time. This predetermined time is longer for a screen smaller in "fd", and is shorter for a screen larger in "fd".

An example in which unified memory 1200 is accessed with a display access time being taken into consideration is shown in FIG. 8. Individual access operations are accomplished at high speed by the burst access method set forth earlier in this SPECIFICATION. In split access mode, independent access operations are performed in the display data access units 41, 42, and 43 that correspond to instruction execution cycles 1, 2, and 3. Since display is not the only purpose of access to unified memory 1200, priority arbitration occurs according to purpose and the actual type of access executed alternates between display and other purposes. Although this example assumes that control alternates between display access and other types of access, actual display access can be made every other time or in other order. In these cases, the total time required for access in display data access units 41, 42, and 43 will increase, and, thus, the predetermined time requirement for display on a screen large in "fd" may not be satisfied. At the same time, however, instruction processing unit 1110 will be reduced in access latency, since control alternates between access from instruction processing unit 1110 and display access.

Conversely, a larger screen display can be produced in the batch access mode. In this mode, data for creating screen display 40 is accessed in access units 41, 42, and 43 at the same time. In this case, the total time required for the access in access units 41, 42, and 43 is reduced, and a screen display larger in "fd" can be produced. This access sequence is accomplished by specifying the batch access instruction mode, and batch access notification information is sent from display control unit 1140 to unified memory control unit 1170. When the information is received, unified memory control unit 1170 provides control so that only display access operations will be performed.

An example of using split access or batch access, depending on the specified display access mode, is shown in FIG. 9. Changing the access mode at an "fd" to "fm" ratio of about 0.3 is suggested. In the split access mode, "fd/fm" is smaller than 0.3 and since the screen size is also likely to be small, frequency example 1 in FIG. 3 corresponds this case. In the batch access mode, "fd/fm" is greater than 0.3 and since the screen size is also likely to be large, frequency example 2 in FIG. 3 corresponds to this case. The mode change timing value of 0.3 depends on factors such as the number of displays to be combined, and the user can set the appropriate timing value according to the particular characteristics of the system.

Figures 11, 12:
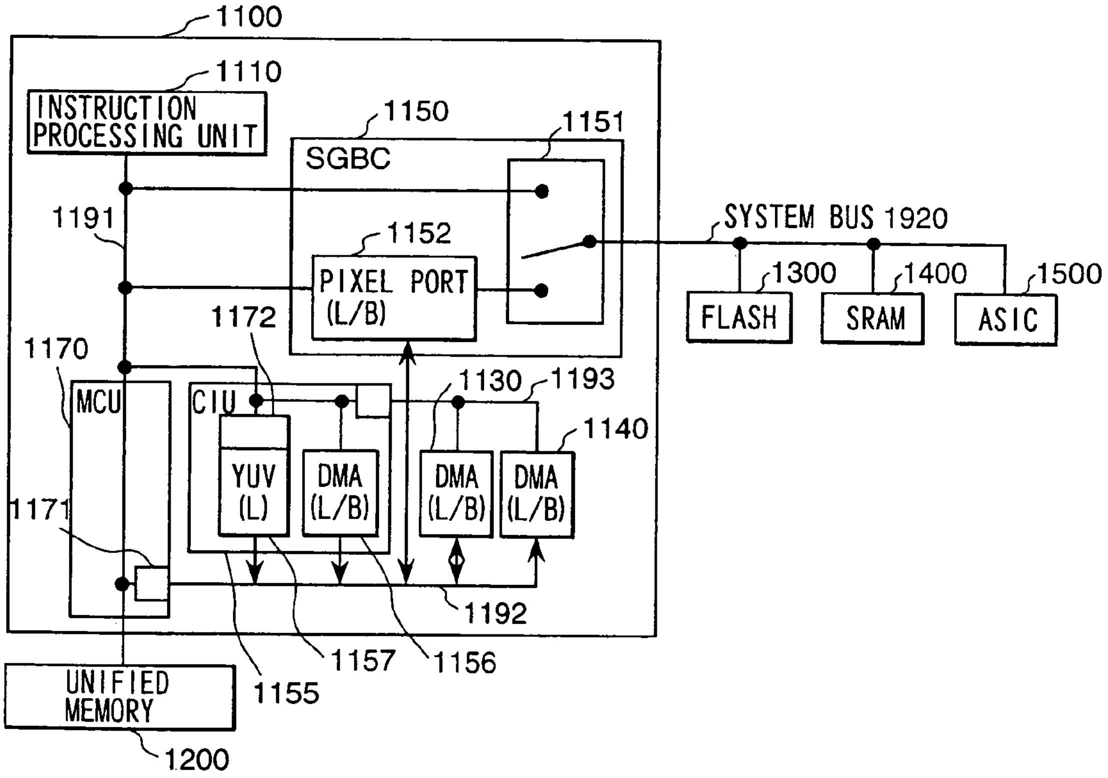
FIG. 11 is a diagram of the register function based on the present invention.
FIG. 12 is a detailed block diagram of the internal CPU of the multimedia data-processing system based on the present invention.

More specific examples of mode selection for access to unified memory 1200 are shown in FIGS. 10 and 11. The UMMR register shown in FIG. 10 has five mode bits: AM, PC, DPM, EC, and DAM.

(1) AM is short for Arbitration Mode bit. This bit specifies the method of assigning priority levels for bus arbitration. New settings by AM bit updating are made valid for the next vertical flyback time period onward.

When AM='0':

The system bus control unit (SGBC) 1150, pixel generation unit (RU) 1130, and CPU interface (CIU) 1155 shown in FIG. 12 take the same priority level, and bus access control is assigned to these three units in the order of the arrival of their access requests. Of course, if either of the three units and a higher-priority unit (such as VIU or DU) issue a bus access control request at the same time, VIU or DU will take precedence. The above-mentioned order of arrival applies only to SGBC, RU, and CIU. (Default)

When AM='1':

An independent priority level can be assigned to each SGBC, RU, and CIU. However, the same priority level cannot be assigned to two or more units.

(2) PC is short for Priority Change mode bit. The priority levels that have been specified in registers are set as the priority levels for bus arbitration. The PC mode bit is valid only when AM is set to '1'.

When PC='0':

The priority levels that have been specified in registers (SPR, RPR, PP1R, PP2R) are not set as the priority levels for bus arbitration. (Default)

When PC='1':

The priority levels that have been specified in registers are set as the priority levels for bus arbitration. The priority levels for bus arbitration, however, are updated, only when all the above registers are correctly set. When data settings are correct, the above register data is incorporated during internal updating, and then the PC bit is cleared automatically. Even when data settings are wrong, the PC bit is also cleared automatically during the next vertical flyback time period.

(3) DPM, short for Display unit Preference Mode bit, specifies a bus arbitration priority level to the display unit. New settings by DPM bit updating are made valid during the next vertical flyback time period.

When DPM='0':

The same priority level is assigned to the display unit and the video input unit. (Default)

When DPM='1':

The display unit takes a higher priority level than that of the video input unit. The screen display size can be increased, compared with the case of '0'. If the setting of the DPM bit is '1', normal operation of the video input unit is guaranteed, only when it satisfies limitations.

(4) EC, short for Endian Change mode bit, specifies whether the endian change function is to be performed on units such as the pixel generation unit and display unit.

When EC='0':

No endian changes are not performed between the display unit, the pixel generation unit, and the unified memory control unit.

When EC='1':

Endian changes are performed between the display unit, the pixel generation unit, and the unified memory control unit.

(5) DAM, short for Display Access Mode bit, specifies whether multiple-screen display access is to be split or to made in batch form. This scheme is an embodiment of access based on the data settings of FIG. 9.

When DAM='0':

Multiple-screen display access is split. (Default)

When DAM='1':

Multiple-screen display access is made in batch form.

The PRR register specifying priority according to the particular setting of the PC of the UMMR register in FIG. 10 is shown in FIG. 11. Higher bus arbitration priority is assigned in the following order:

MP priority to the MCU (unified memory control unit 1170), CP priority to the CIU (CPU interface 1155), SP priority to SGBC (system bus control unit 1150), and RP priority to the RU (pixel generation unit 1130). The priority level for bus arbitration is to be specified in two bits for each unit. It is prohibited to assign the same value to multiple units.

A detailed block diagram of the CPU 1100, which is inside the multimedia data-processing system of FIG. 1 is shown in FIG. 12. The differences between the settings shown as frequency examples 1 and 2 in FIG. 3, the EC mode operation of the UMMR register in FIG. 10, and the corresponding data transfer path will be described below with reference to the detailed block diagram of FIG. 12.

Selector 1151 operates according to the mode, and depending on this, the system bus 1920 is connected to the internal bus 1191 via the pixel port 1152 of the system bus control unit (SGBC) 1150 or is connected directly to the internal bus. The former case applies to frequency example 1 shown in FIG. 3, and the latter case to frequency example 2.

Endian changes are conducted by the endian changer 1171 within unified memory control unit (MCU) 1170. These changes are conducted for the purpose of arbitration between the display control unit (DU) 1140 and pixel generation unit (RBU) 1130 that operate under the little-endian scheme, and the unified memory 1200 within which data will be arranged under the same endian scheme as that of instruction processing unit 1110. If the endian of instruction processing unit 1110 is "little", it is specified that no changes will be conducted, and if the endian is "big", it is specified that changes be specified.

CPU 1100 has a pixel port 1152, which functions as a transfer mediator between external devices (1300, 1400, 1500) and the unified memory 1200, and a DMA module 1156 for CPU interface CIU 1155. These components have setup bits in the respective modules so as to ensure matching between unified memory 1200 and the endian of the data itself within the external devices.

Also, since the data converter (YUV) 1157 of the CPU interface CIU 1155 operates in the little-endian mode, endian changer 1172 is required at the entrance as well. Of course, such a configuration may be modifiable by entering the proper data.

Figure 13:
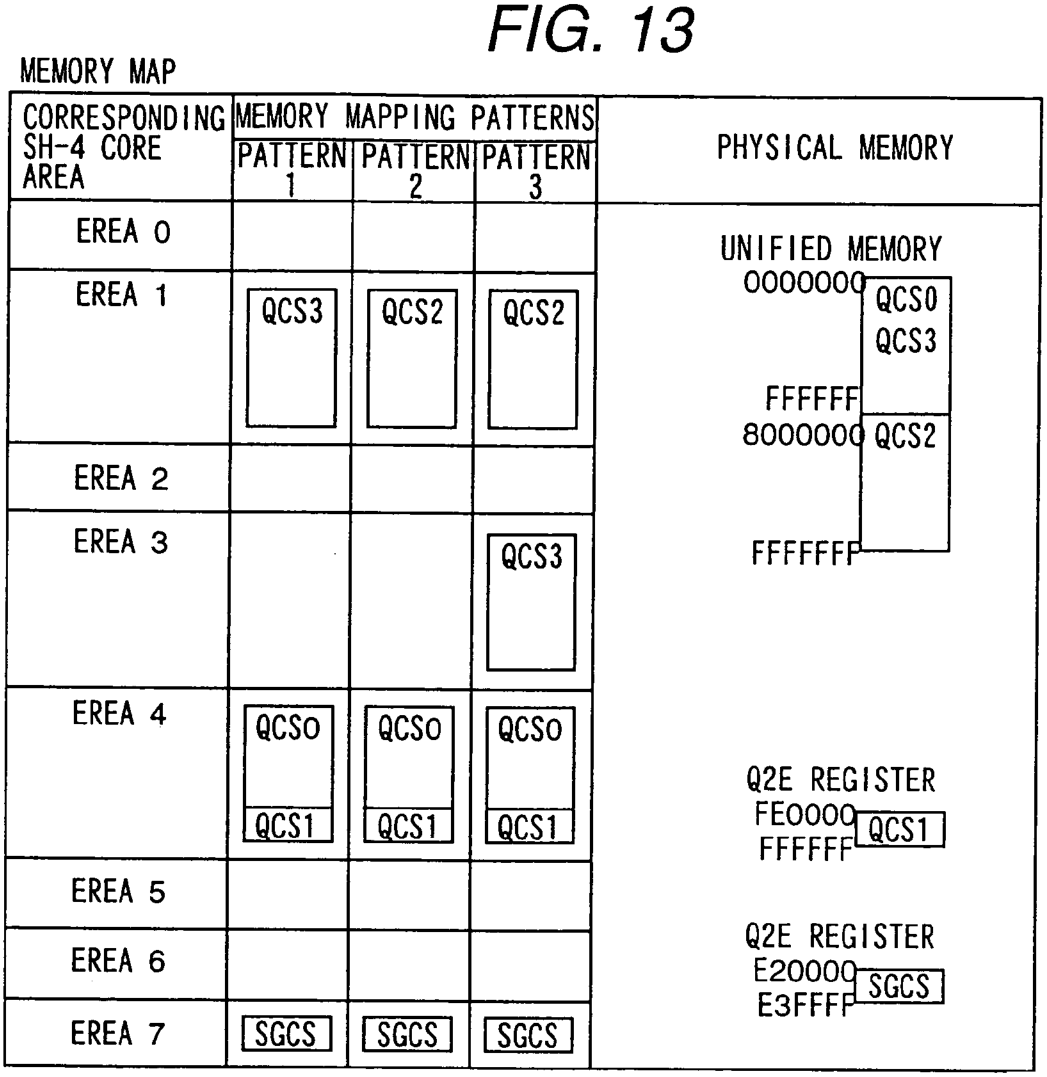
FIG. 13 is a diagram which shows an example of a memory map based on the present invention.

A memory map of the various resources when viewed from instruction processing unit 1110 is shown in FIG. 13. This map enables pattern 1, 2, or 3 to be selected by specifying the mode. Thus, increases in the capacity of unified memory 1200 and its changes in function can be accommodated.

In FIG. 13, QCS0 to QCS3 and SGCS denote the types of address spaces. These address spaces are reserved within physically specific areas. To what space the address viewed from CPU 1100 will be assigned can be freely mapped using the address conversion function contained in CPU 1100. QCS0 and QCS2 comprise space in the unified memory 1200 and its extended space, respectively. QCS1 is a register space, and QCS3 is an alias space for tile linear conversion, and this space is the same memory area as QCS0. The tile linear conversion here refers to converting the structure of CPU 1100 linear addressing into tile-form addressing of unified memory 1200.

CPU 1100 has an endian changer 1171 in the unified memory control unit (MCU) 1170, and such structure is realized by specifying whether conversion is to occur in space. The SGCS space is a register space for system control.

Next, details of the interface will be described below.

As shown in FIG. 12, CPU interface (CIU) 1155, pixel generation unit (RU) 1130, display control unit (DU) 1140, pixel port 1152, and unified memory control unit (MCU) 1170 are connected via internal bus 1192. Also, pixel generation unit (RBU) 1130, display control unit (DU) 1140, and CPU interface (CIU) 1155 are connected via bus 1193. The operation of the former will be described with reference to FIGS. 14 to 16, and the operation of the latter will be described with reference to FIGS. 17 to 21.

Figure 14:
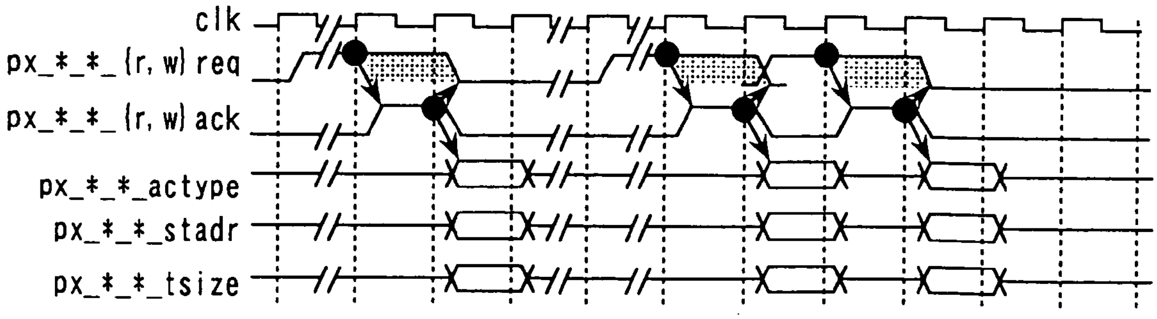
FIG. 14 is a request/command stage waveform diagram of an image bus based on the present invention.
Figure 15:
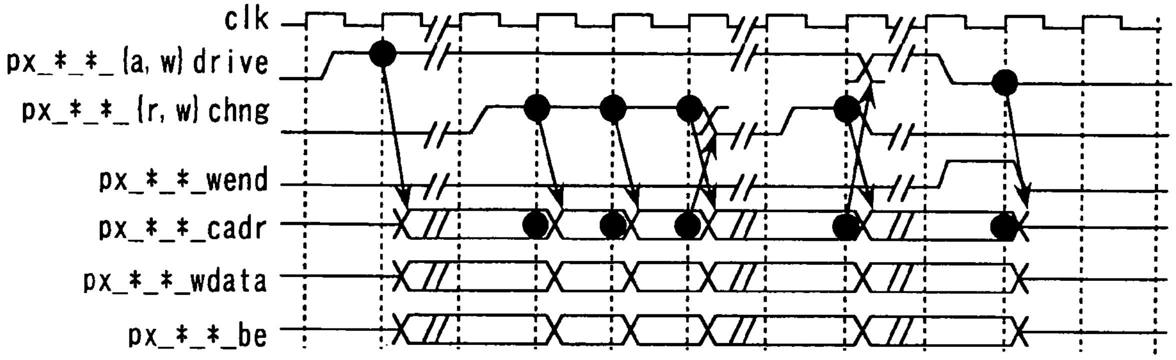
FIG. 15 is a write data stage waveform diagram of the image bus based on the present invention.
Figure 16:
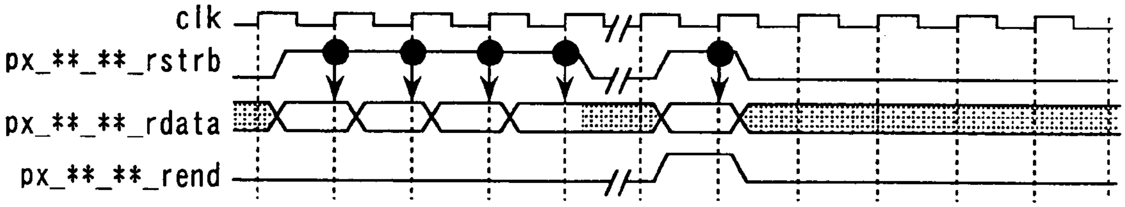
FIG. 16 is a read data stage waveform diagram of the image bus based on the present invention.

The interface described with reference FIGS. 14 to 16 is an interface accessed from each module to unified memory 1200 in accordance with a multipoint-to-unipoint connection protocol. The protocol for judging the priority for use of this interface is shown in FIG. 14, and the waveforms of a data write signal and a data read signal are shown in FIGS. 15 and 16, respectively. The asterisk symbol (*) appearing as a signal name in each figure denotes an arbitrary unit, and, for example, if this unit is display control unit 1140, it is denoted as "du". Hereinafter, this unit is taken as a unit that performs read operations. Similarly, video input unit 1120 is denoted as "vu", which functions as a unit to perform write operations. Unified memory control unit 1170 is denoted as "mu".

A further detailed description of FIG. 14 is given below. When a unit is to access unified memory 1200, this unit asserts access request signals "px_vu_mu_wreq" (w: write) and "px_du_mu_rreq" (r: read). After this, unified memory control unit 1170 performs priority judgments and then returns an acknowledge signal to the appropriate unit. For example, one cycle of "px_mu_vu_wack" and "px_mu_du_rack" signal information is asserted. In response to this, the request source negates "px_vu_mu_wreq" and "px_du_mu_rreq". If the next request is present at this time, this request signal can be asserted immediately. At the same time the request source negates "px_vu_mu_wreq" and "px_du_mu_rreq", it asserts the signal denoting the attribute of the requested access.

The above will be described in further detail below. The "px_mu_vu_actype" and "px_mu_du_actype" signals denote the types of access. If the signal level is '0', unified memory 1200 is accessed using addresses different by one cycle. This access scheme is referred to as the random mode, which is suitable for writing into any address as in pixel generation unit 1120. If the signal level is '1', sequential data access beginning with the starting address takes place. This is referred to as the sequential mode, which is suitable for such purposes as reading out display data. Since these two types of access modes are provided, the quantity of address creation logic in the entire system can be minimized. Signals "px_vu_mu_stadr" and "px_du_mu_stadr" denote the starting addresses of access to unified memory 1200. Prior to actual transfer, the ACT commands of unified memory control unit 1170 can be started by communicating the above-mentioned starting addresses to unified memory control unit 1170. Signals "px_vu_mu_tsize" and "px_du_mu_tsize" denote access counts. These signals are required for the support of the burst transfer described earlier in this SPECIFICATION, and the burst length can be freely changed.

In this way, requests and confirmations are performed, and then the write (w) or read (r) phase begins.

The write operation is shown in FIG. 15. Signal "px_mu_vu_{a, w} drive" indicates to the request source that the bus be driven. This signal is necessary for the purpose of preventing the bus driver from conflicting or floating during the use of the buses constructed in tri-state logic. After receiving this signal, the request source sends address signal "px_vu_mu_cadr", write data "px_vu_mu_wdata", and its byte enable signal "px_vu_mu_be". If the internal bus of the LSI is mounted in selector logic, however, the signal mentioned above is not required, and even when data is sent in earlier timing, it is not just selected and no problems arise. Signal "px_mu_vu_wchng" indicates to the request source that control be changed to the next address and write data. For example, this signal is used to control a latency caused by unusual operation of unified memory control unit 1170, such as a page error. This control method is valid only during the random mode. When transfer is repeated the required number of times and the last data is acquired, "px_mu_vu_wend" will be asserted as the ending signal.

The read operation is shown in FIG. 16. Addresses are exchanged similarly to the case of FIG. 15. For reading, since the access latency of unified memory 1200 always exists from the reception of addresses to the return of data, an interface allowing for this latency is required. Signal "px_mu_du_rdata" indicates that the corresponding data has been read, and "px_mu_du_rstrb" is a strobe signal indicating that the data is valid during the particular period. The end of transfer is denoted as "px_mu_vu_rend".

The interface described with reference to FIGS. 17 to 21, namely, bus 1193 in FIG. 12, relates mainly to register access. This interface uses a multipoint-to-unipoint connection protocol enabling access from the register access master to each module.

Figure 17:
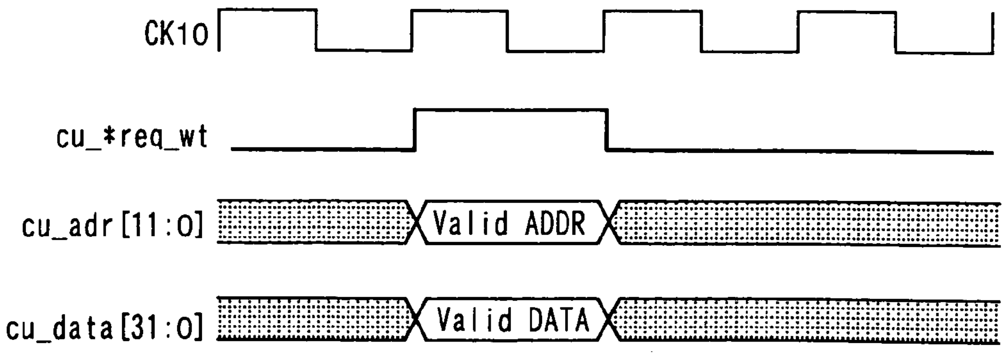
FIG. 17 is a write signal waveform diagram of a setup bus based on the present invention.

Write-access is shown in FIG. 17. Address "cu_adr" and write data "cu_date" are asserted at the same time that a "cu_*req_wt" signal (write request signal) is asserted.

Figure 18:
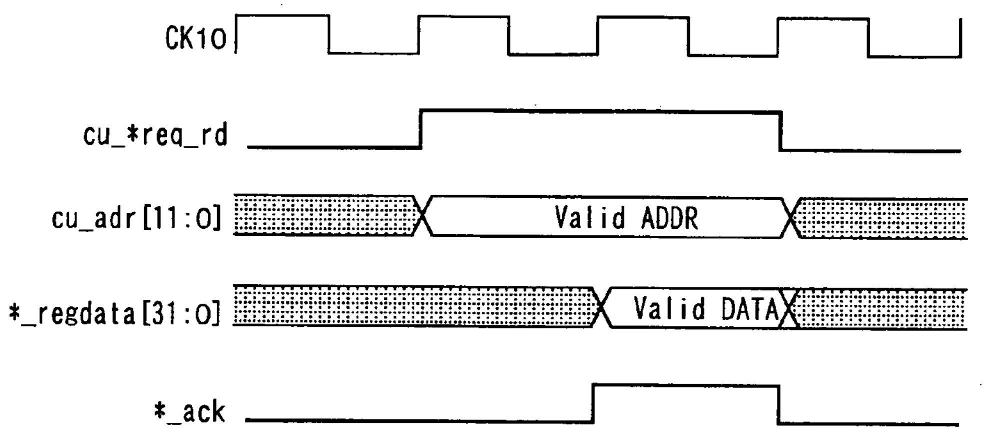
FIG. 18 is a read signal waveform diagram of the setup bus based on the present invention.

Read-access is shown in FIG. 18. Address "cu_adr" is asserted at the same time that a "cu_*req_rd" signal (read request signal) is asserted. When the request source unit is set up for output of valid data, this unit sends *_reqdata" together with "*_ack".

Figure 19:
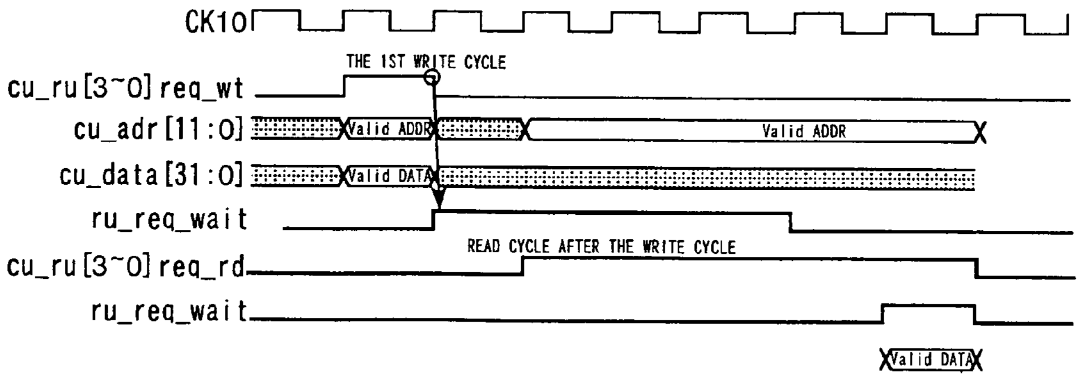
FIG. 19 is a diagram showing a wait signal waveform generated by writing via the setup bus based on the present invention.

The status where a wait time (latency) occurs in write-access is shown in FIG. 19. Along with the assertion of the "cu_*req_wt" signal, a wait signal "*_req_wait" is asserted.

Figure 20:
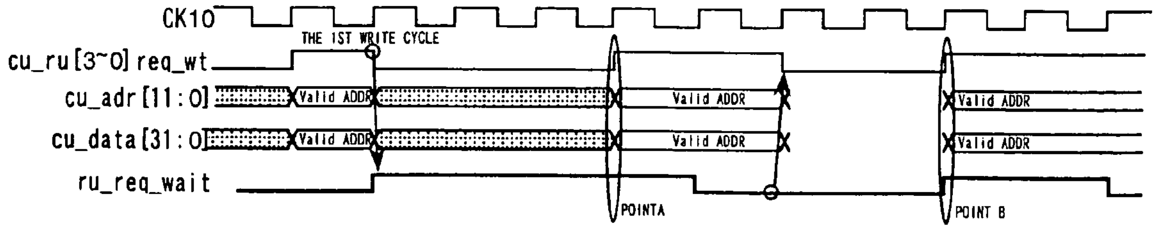
FIG. 20 is a diagram showing another wait signal waveform generated by writing via the setup bus based on the present invention.

The waveform developed when the next write request signal arrives with the wait signal on is shown in FIG. 20. The wait signal "*_req_wait" is asserted in the timing of the second write cycle (Point A), and the write operation is made to wait. Even if the request source causes the wait signal "*_req_wait" to be asserted in the timing of the third write cycle (Point B), the write operation will also be made to wait.

Figure 21:
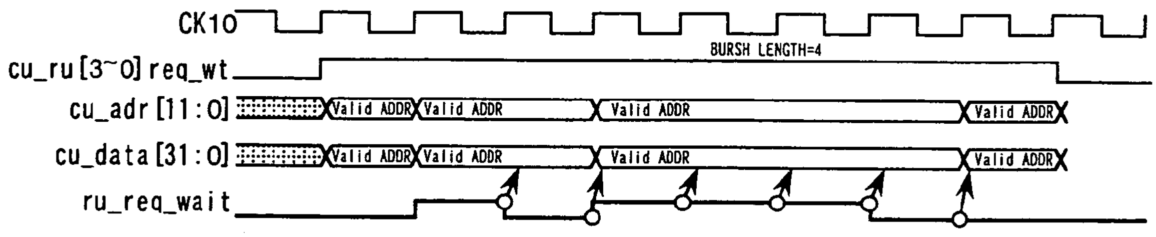
FIG. 21 is a diagram that shows burst writing via the setup bus based on the present invention.

A waveform showing the burst write operation is shown in FIG. 21. Burst transfer can be implemented by issuing a plurality of cycle requests using the same signal as the write operation signal.

As described above, according to the present invention, latency can be reduced since access from the instruction processing unit to the unified memory is directly made via an interface that can be driven at high speed, instead of the system controller constituting the instruction processing unit and the chipset. Thus, even in an unified memory configuration, it is possible to suppress the extension of an instruction processing time and to minimize the deterioration of system performance.

It is also possible to make efficient access from the instruction processing unit by increasing its operating frequency to an integer multiple of the frequency of the unified memory port. Likewise, the operating frequency of the instruction processing unit can be increased to an integer multiple of the frequency of the system bus, and, in addition, data that matches the particular characteristics of the system can be easily set by making those ratios selectable.

Furthermore, since a plurality of sets of data can be transferred in one bus cycle in the burst access mode, bus efficiency can be improved and a series of access latencies can be reduced.

Besides, it is possible to optimize latency by assigning the appropriate priority for access to the unified memory, to improve burst data transfer efficiency by processing together the transfer of data via the system bus and the transfer of data via the instruction processing unit, and to minimize the repetition of processing by providing an endian change function in order to minimize the repetition of the data transfer itself.

The invention claimed is:

1. A data processor formed on a LSI, comprising:

a central processing unit;

a first internal bus coupled to said central processing unit;

a second internal bus;

a memory controller couples to said central processing unit, said first internal bus, and said second internal bus, wherein said memory controller interfaces to an external synchronous DRAM, receives address information from said central processing unit via said first internal bus, and provides an address based on said address information to said external synchronous DRAM;

a display control unit providing display signals to outside of the data processor;

a bus controller coupled to said central processing unit via said first internal bus, and coupled to external flash memory and/or static RAM via an external system bus, wherein said display control unit is operable to be coupled to said second internal bus, and to be coupled to said memory controller accessing said external synchronous DRAM, and wherein said central processing unit said display control unit are operable to be shared with a memory area of said external synchronous DRAM.

2. A data processor according to claim 1, wherein said central processing unit is operable to access said external synchronous memory by said memory controller.

3. A data processor according to claim 2, wherein said central processing unit is operable to access said external flash memory and/or static RAM via said first internal bus by said bus controller.

4. A data processor according to claim 3, wherein said bus controller is operable to transfer data signals between said external synchronous memory and said external flash memory and/or static RAM via said memory controller and said bus controller.

5. A data processor formed on a LSI, comprising:

a central processing unit;

a first bus coupled to said central processing unit;

a second bus;

a memory controller coupled to said central processing unit via said first bus, coupled to said second bus, and for coupling to and external SDRAM;

a bus controller coupled to said central processing unit via said first bus, and for coupling to external flash memory and/or SRAM; and a graphic generation unit that generates a graphic pattern, that is coupled to said second bus, wherein said central processing unit and said graphic generation unit are operable to be shared with a memory area of said external SDRAM, wherein said central processing unit is operable to access said external flash memory and/or said SRAM via said first bus, and wherein said graphic generation unit is operable to access said external SDRAM via said second bus.

6. A data processor according to claim 5, wherein said graphic generation unit is operable to store said graphic pattern in said external SDRAM.

7. A data processor according to claim 6, wherein said central processing unit is operable to access said external SDRAM by said memory controller to store data or to read data.

* * * * *